(12) United States Patent
Hunt, III

(10) Patent No.: US 9,697,568 B1
(45) Date of Patent: *Jul. 4, 2017

(54) SYSTEM AND METHODS FOR CREDIT DISPUTE PROCESSING, RESOLUTION, AND REPORTING

(71) Applicant: CONSUMERINFO.COM, INC., Costa Mesa, CA (US)

(72) Inventor: Herbert Harris Hunt, III, Irvine, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,823

(22) Filed: Jun. 28, 2016

Related U.S. Application Data

(63) Continuation of application No. 13/831,341, filed on Mar. 14, 2013, now Pat. No. 9,406,085.

(51) Int. Cl.
  *G06Q 40/00* (2012.01)
  *G06Q 40/02* (2012.01)

(52) U.S. Cl.
  CPC .................. *G06Q 40/025* (2013.01)

(58) Field of Classification Search
  USPC ..... 705/26, 30, 40, 45, 39, 42, 37, 38, 7.14, 705/80, 26.41, 309; 345/758, 163; 379/265.11; 360/92.1
  See application file for complete search history.

(56) References Cited

U.S. PATENT DOCUMENTS

| 3,405,457 A | 10/1968 | Bitzer |
| 4,346,442 A | 8/1982 | Musmanno |
| 4,734,858 A | 3/1988 | Schlafly |
| 4,755,940 A | 7/1988 | Brachtl et al. |
| 4,774,664 A | 9/1988 | Campbell et al. |
| 4,891,503 A | 1/1990 | Jewell |
| 4,977,595 A | 12/1990 | Ohta et al. |
| 4,989,141 A | 1/1991 | Lyons et al. |

(Continued)

FOREIGN PATENT DOCUMENTS

| EP | 0 542 298 | 5/1993 |
| EP | 1 239 378 | 1/2002 |

(Continued)

OTHER PUBLICATIONS

Disputes in cyberspace 2001; Update of online dispute resolution for consumers in cross-border disputes; Office for Developed and Transition Economies; Consumers International Nov. 2001.*

(Continued)

*Primary Examiner* — Tien Nguyen
(74) *Attorney, Agent, or Firm* — Knobbe, Martens, Olson & Bear LLP

(57) ABSTRACT

Systems and methods are provided for credit dispute processing, resolution, and reporting. Credit dispute resolution requests may be received, processed, and sent to a credit bureau for submission to creditors. Status of credit dispute resolutions may be reported to consumers. If a creditor's response time is longer than its average response time or if a creditor does not respond to a credit dispute resolution request within a regulatory response period, alerts and reports may be sent to consumers to provide consumers with further options.

15 Claims, 9 Drawing Sheets

(56) References Cited

U.S. PATENT DOCUMENTS

| | | |
|---|---|---|
| 5,126,936 A | 6/1992 | Champion et al. |
| 5,148,365 A | 9/1992 | Dembo |
| 5,220,501 A | 6/1993 | Lawlor et al. |
| 5,262,941 A | 11/1993 | Saladin |
| 5,274,547 A | 12/1993 | Zoffel et al. |
| 5,336,870 A | 8/1994 | Hughes et al. |
| 5,383,113 A | 1/1995 | Kight et al. |
| 5,404,518 A | 4/1995 | Gilbertson et al. |
| 5,500,513 A | 3/1996 | Langhans et al. |
| 5,590,038 A | 12/1996 | Pitroda |
| 5,592,560 A | 1/1997 | Deaton et al. |
| 5,640,577 A | 6/1997 | Scharmer |
| 5,659,725 A | 8/1997 | Levy et al. |
| 5,659,731 A | 8/1997 | Gustafson |
| 5,719,941 A | 2/1998 | Swift et al. |
| 5,729,735 A | 3/1998 | Meyering |
| 5,739,512 A | 4/1998 | Tognazzini |
| 5,754,632 A | 5/1998 | Smith |
| 5,819,234 A | 10/1998 | Slavin et al. |
| 5,832,068 A | 11/1998 | Smith |
| 5,842,211 A | 11/1998 | Horadan et al. |
| 5,844,218 A | 12/1998 | Kawan et al. |
| 5,870,721 A | 2/1999 | Norris |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,930,776 A | 7/1999 | Dykstra et al. |
| 5,956,693 A | 9/1999 | Geerlings |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,064,990 A | 5/2000 | Goldsmith |
| 6,072,894 A | 6/2000 | Payne |
| 6,073,140 A | 6/2000 | Morgan et al. |
| 6,085,242 A | 7/2000 | Chandra |
| 6,088,686 A | 7/2000 | Walker et al. |
| 6,112,190 A | 8/2000 | Fletcher et al. |
| 6,119,103 A | 9/2000 | Basch et al. |
| 6,128,602 A | 10/2000 | Northington et al. |
| 6,149,441 A | 11/2000 | Pellegrino et al. |
| 6,157,707 A | 12/2000 | Baulier et al. |
| 6,161,139 A | 12/2000 | Win et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,202,067 B1 | 3/2001 | Blood et al. |
| 6,233,566 B1 | 5/2001 | Levine et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,282,658 B2 | 8/2001 | French et al. |
| 6,295,541 B1 | 9/2001 | Bodnar et al. |
| 6,304,860 B1 | 10/2001 | Martin et al. |
| 6,311,169 B2 | 10/2001 | Duhon |
| 6,321,339 B1 | 11/2001 | French et al. |
| 6,327,578 B1 | 12/2001 | Linehan |
| 6,330,551 B1 * | 12/2001 | Burchetta ............ G06Q 10/10 705/37 |
| 6,343,279 B1 | 1/2002 | Bissonette et al. |
| 6,353,778 B1 | 3/2002 | Brown |
| 6,356,937 B1 | 3/2002 | Montville et al. |
| 6,374,262 B1 | 4/2002 | Kodama |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,181 B2 | 6/2002 | Lent et al. |
| 6,421,675 B1 | 7/2002 | Ryan et al. |
| 6,421,729 B1 | 7/2002 | Paltenghe et al. |
| 6,422,462 B1 | 7/2002 | Cohen |
| 6,453,353 B1 | 9/2002 | Win et al. |
| 6,457,012 B1 | 9/2002 | Jatkowski |
| 6,496,936 B1 | 12/2002 | French et al. |
| 5,870,721 C1 | 1/2003 | Norris |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,587,841 B1 | 7/2003 | DeFrancesco |
| 6,611,816 B2 | 8/2003 | Lebda et al. |
| 6,615,193 B1 | 9/2003 | Kingdon et al. |
| 6,629,245 B1 | 9/2003 | Stone et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,703,930 B2 | 3/2004 | Skinner |
| 6,714,944 B1 | 3/2004 | Shapiro et al. |
| 6,718,313 B1 | 4/2004 | Lent et al. |
| 6,725,381 B1 | 4/2004 | Smith et al. |
| 6,745,938 B2 | 6/2004 | Sullivan |
| 6,750,985 B2 | 6/2004 | Rhoads |
| 6,766,327 B2 | 7/2004 | Morgan, Jr. et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,845,448 B1 | 1/2005 | Chaganti et al. |
| 6,857,073 B2 | 2/2005 | French et al. |
| 6,871,287 B1 | 3/2005 | Ellingson |
| 6,892,307 B1 | 5/2005 | Wood et al. |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,941,323 B1 | 9/2005 | Galperin |
| 6,947,989 B2 | 9/2005 | Gullotta et al. |
| 6,950,807 B2 | 9/2005 | Brock |
| 6,962,336 B2 | 11/2005 | Glass |
| 6,965,881 B1 | 11/2005 | Brickell et al. |
| 6,968,319 B1 | 11/2005 | Remington et al. |
| 6,973,462 B2 | 12/2005 | Dattero et al. |
| 6,985,887 B1 | 1/2006 | Sunstein et al. |
| 6,988,085 B2 | 1/2006 | Hedy |
| 6,993,572 B2 | 1/2006 | Ross, Jr. et al. |
| 6,999,941 B1 | 2/2006 | Agarwal |
| 7,013,315 B1 | 3/2006 | Boothby |
| 7,016,907 B2 | 3/2006 | Boreham et al. |
| 7,024,548 B1 | 4/2006 | O'Toole, Jr. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,069,240 B2 | 6/2006 | Spero et al. |

(56) References Cited

U.S. PATENT DOCUMENTS

| | | |
|---|---|---|
| 7,072,909 B2 | 7/2006 | Polk |
| 7,076,462 B1 | 7/2006 | Nelson et al. |
| 7,085,727 B2 | 8/2006 | VanOrman |
| 7,089,594 B2 | 8/2006 | Lal et al. |
| 7,107,241 B1 | 9/2006 | Pinto |
| 7,117,172 B1 | 10/2006 | Black |
| 7,124,144 B2 | 10/2006 | Christianson et al. |
| 7,143,063 B2 | 11/2006 | Lent |
| 7,155,725 B1 | 12/2006 | Kister et al. |
| 7,155,739 B2 | 12/2006 | Bari et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,218,912 B2 | 5/2007 | Erskine et al. |
| 7,219,107 B2 | 5/2007 | Beringer |
| 7,222,369 B2 | 5/2007 | Vering et al. |
| 7,234,156 B2 | 6/2007 | French et al. |
| 7,236,950 B2 | 6/2007 | Savage et al. |
| 7,243,369 B2 | 7/2007 | Bhat et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,310,611 B2 | 12/2007 | Shibuya et al. |
| 7,310,617 B1 | 12/2007 | Cunningham |
| 7,310,618 B2 | 12/2007 | Libman |
| 7,314,167 B1 | 1/2008 | Kiliccote |
| 7,315,837 B2 | 1/2008 | Sloan et al. |
| 7,328,233 B2 | 2/2008 | Salim et al. |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,516 B2 * | 4/2008 | Richey ............ G06Q 10/087 705/14.51 |
| 7,366,694 B2 | 4/2008 | Lazerson |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,587,368 B2 | 9/2009 | Felsher |
| 7,593,891 B2 | 9/2009 | Kornegay et al. |
| 7,594,019 B2 | 9/2009 | Clapper |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,620,653 B1 | 11/2009 | Swartz |
| 7,623,844 B2 | 11/2009 | Herrmann et al. |
| 7,630,903 B1 * | 12/2009 | Vaidyanathan ........ G06Q 10/10 705/1.1 |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,644,035 B1 * | 1/2010 | Biffle ................ G06Q 20/10 705/39 |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,676,410 B2 | 3/2010 | Petralia |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,707 B2 | 5/2010 | Kelley |
| 7,715,832 B2 | 5/2010 | Zhou |
| 7,720,846 B1 | 5/2010 | Bayliss |
| 7,725,385 B2 | 5/2010 | Royer et al. |
| 7,729,959 B1 | 6/2010 | Wells et al. |
| 7,730,078 B2 | 6/2010 | Schwabe et al. |
| 7,734,522 B2 | 6/2010 | Johnson et al. |
| 7,734,637 B2 | 6/2010 | Greifeneder et al. |
| 7,739,707 B2 | 6/2010 | Sie et al. |
| 7,747,520 B2 | 6/2010 | Livermore et al. |
| 7,747,521 B2 | 6/2010 | Serio |
| 7,756,789 B2 | 7/2010 | Welker et al. |
| 7,761,373 B2 | 7/2010 | Metz |

(56) References Cited

U.S. PATENT DOCUMENTS

| | | | |
|---|---|---|---|
| 7,761,384 B2 | 7/2010 | Madhogarhia | |
| 7,765,148 B2 | 7/2010 | German et al. | |
| 7,765,166 B2 | 7/2010 | Beringer et al. | |
| 7,769,697 B2 | 8/2010 | Fieschi et al. | |
| 7,774,257 B2 | 8/2010 | Maggioncalda et al. | |
| 7,774,270 B1 | 8/2010 | MacCloskey | |
| 7,783,515 B1 | 8/2010 | Kumar et al. | |
| 7,787,869 B2 | 8/2010 | Rice et al. | |
| 7,788,040 B2 | 8/2010 | Haskell et al. | |
| 7,792,715 B1 | 9/2010 | Kasower | |
| 7,792,725 B2 | 9/2010 | Booraem et al. | |
| 7,792,903 B2 | 9/2010 | Fischer et al. | |
| 7,793,835 B1 | 9/2010 | Coggeshall et al. | |
| 7,797,252 B2 | 9/2010 | Rosskamm et al. | |
| 7,801,807 B2 | 9/2010 | DeFrancesco et al. | |
| 7,801,811 B1 | 9/2010 | Merrell et al. | |
| 7,801,956 B1 | 9/2010 | Cumberbatch et al. | |
| 7,802,104 B2 | 9/2010 | Dickinson | |
| 7,805,362 B1 | 9/2010 | Merrell et al. | |
| 7,809,398 B2 | 10/2010 | Pearson | |
| 7,809,797 B2 | 10/2010 | Cooley et al. | |
| 7,810,036 B2 | 10/2010 | Bales et al. | |
| 7,814,002 B2 | 10/2010 | DeFrancesco et al. | |
| 7,814,005 B2 | 10/2010 | Imrey et al. | |
| 7,818,228 B1 | 10/2010 | Coulter | |
| 7,818,229 B2 | 10/2010 | Imrey et al. | |
| 7,827,115 B2 | 11/2010 | Weller et al. | |
| 7,832,006 B2 | 11/2010 | Chen et al. | |
| 7,835,983 B2 | 11/2010 | Lefner et al. | |
| 7,840,484 B2 | 11/2010 | Haggerty et al. | |
| 7,841,004 B1 | 11/2010 | Balducci et al. | |
| 7,841,008 B1 | 11/2010 | Cole et al. | |
| 7,844,520 B1 | 11/2010 | Franklin | |
| 7,844,604 B2 | 11/2010 | Baio et al. | |
| 7,848,972 B1 | 12/2010 | Sharma | |
| 7,848,978 B2 | 12/2010 | Imrey et al. | |
| 7,849,014 B2 | 12/2010 | Erikson | |
| 7,853,493 B2 | 12/2010 | DeBie et al. | |
| 7,856,203 B2 | 12/2010 | Lipovski | |
| 7,856,386 B2 | 12/2010 | Hazlehurst et al. | |
| 7,870,066 B2 * | 1/2011 | Lin | G06Q 20/10 705/39 |
| 7,870,078 B2 | 1/2011 | Clark et al. | |
| 7,877,304 B1 | 1/2011 | Coulter | |
| 7,877,784 B2 | 1/2011 | Chow et al. | |
| 7,890,403 B1 | 2/2011 | Smith | |
| 7,899,750 B1 | 3/2011 | Klieman et al. | |
| 7,908,242 B1 | 3/2011 | Achanta | |
| 7,909,246 B2 | 3/2011 | Hogg et al. | |
| 7,912,842 B1 | 3/2011 | Bayliss et al. | |
| 7,912,865 B2 | 3/2011 | Akerman et al. | |
| 7,925,582 B1 | 4/2011 | Kornegay et al. | |
| 7,925,982 B2 | 4/2011 | Parker | |
| 7,954,698 B1 | 6/2011 | Pliha | |
| 7,958,046 B2 | 6/2011 | Doerner et al. | |
| 7,966,192 B2 | 6/2011 | Pagliari et al. | |
| 7,970,676 B2 | 6/2011 | Feinstein | |
| 7,970,679 B2 | 6/2011 | Kasower | |
| 7,970,698 B2 | 6/2011 | Gupta et al. | |
| 7,975,299 B1 | 7/2011 | Balducci et al. | |
| 7,979,908 B2 | 7/2011 | Millwee | |
| 7,983,932 B2 | 7/2011 | Kane | |
| 7,987,501 B2 | 7/2011 | Miller et al. | |
| 7,991,688 B2 | 8/2011 | Phelan et al. | |
| 8,001,153 B2 | 8/2011 | Skurtovich, Jr. et al. | |
| 8,001,235 B2 | 8/2011 | Russ et al. | |
| 8,006,261 B1 | 8/2011 | Haberman et al. | |
| 8,015,107 B2 | 9/2011 | Kornegay et al. | |
| 8,032,932 B2 | 10/2011 | Speyer et al. | |
| 8,036,941 B2 | 10/2011 | Bennett et al. | |
| 8,037,097 B2 | 10/2011 | Guo et al. | |
| 8,055,904 B1 | 11/2011 | Cato et al. | |
| 8,060,424 B2 | 11/2011 | Kasower | |
| 8,060,438 B2 | 11/2011 | Dhar et al. | |
| 8,060,916 B2 | 11/2011 | Bajaj et al. | |
| 8,065,233 B2 | 11/2011 | Lee et al. | |
| 8,078,453 B2 | 12/2011 | Shaw | |
| 8,078,524 B2 | 12/2011 | Crawford et al. | |
| 8,078,527 B2 | 12/2011 | Cerise et al. | |
| 8,078,528 B1 | 12/2011 | Vicente et al. | |
| 8,078,881 B1 | 12/2011 | Liu | |
| 8,095,443 B2 | 1/2012 | DeBie | |
| 8,095,458 B2 | 1/2012 | Peterson et al. | |
| 8,099,309 B1 | 1/2012 | Bober | |
| 8,099,341 B2 | 1/2012 | Varghese | |
| 8,099,356 B2 | 1/2012 | Feinstein et al. | |
| 8,099,376 B2 | 1/2012 | Serrano-Morales et al. | |
| 8,104,679 B2 | 1/2012 | Brown | |
| 8,108,301 B2 | 1/2012 | Gupta et al. | |
| 8,127,982 B1 | 3/2012 | Casey et al. | |
| 8,127,986 B1 | 3/2012 | Taylor et al. | |
| 8,131,685 B1 | 3/2012 | Gedalius et al. | |
| 8,131,777 B2 | 3/2012 | McCullough | |
| 8,160,960 B1 | 4/2012 | Fei et al. | |
| 8,175,889 B1 | 5/2012 | Girulat et al. | |
| 8,195,549 B2 | 6/2012 | Kasower | |
| 8,201,257 B1 | 6/2012 | Andres et al. | |
| 8,204,812 B2 | 6/2012 | Stewart et al. | |
| 8,219,771 B2 | 7/2012 | Le Neel | |
| 8,224,723 B2 | 7/2012 | Bosch et al. | |
| 8,225,395 B2 | 7/2012 | Atwood et al. | |
| 8,234,498 B2 | 7/2012 | Britti et al. | |
| 8,244,848 B1 | 8/2012 | Narayanan et al. | |
| 8,249,968 B1 | 8/2012 | Oldham et al. | |
| 8,271,393 B2 | 9/2012 | Twining et al. | |
| 8,281,372 B1 | 10/2012 | Vidal | |
| 8,285,613 B1 | 10/2012 | Coulter | |
| 8,285,656 B1 | 10/2012 | Chang et al. | |
| 8,290,840 B2 | 10/2012 | Kasower | |
| 8,290,856 B1 | 10/2012 | Kasower | |
| 8,296,229 B1 | 10/2012 | Yellin et al. | |
| 8,312,033 B1 | 11/2012 | McMillan | |
| 8,321,339 B2 | 11/2012 | Imrey et al. | |
| 8,327,429 B2 | 12/2012 | Speyer et al. | |
| 8,335,741 B2 | 12/2012 | Kornegay et al. | |
| 8,355,967 B2 | 1/2013 | Debie et al. | |
| 8,374,973 B2 | 2/2013 | Herbrich et al. | |
| 8,412,593 B1 | 4/2013 | Song et al. | |
| 8,433,654 B2 | 4/2013 | Subbarao et al. | |
| 8,456,293 B1 | 6/2013 | Trundle et al. | |
| 8,458,062 B2 | 6/2013 | Dutt et al. | |
| 8,464,939 B1 | 6/2013 | Taylor et al. | |
| 8,473,318 B2 | 6/2013 | Nielson et al. | |
| 8,478,674 B1 | 7/2013 | Kapczynski et al. | |
| 8,484,186 B1 | 7/2013 | Kapczynski et al. | |
| 8,499,348 B1 | 7/2013 | Rubin | |
| 8,515,828 B1 | 8/2013 | Wolf et al. | |
| 8,515,844 B2 | 8/2013 | Kasower | |
| 8,527,357 B1 | 9/2013 | Ganesan | |
| 8,533,118 B2 | 9/2013 | Weller et al. | |
| 8,560,436 B2 | 10/2013 | Ingram et al. | |
| 8,560,447 B1 | 10/2013 | Hinghole et al. | |
| 8,572,083 B1 | 10/2013 | Snell et al. | |
| 8,578,036 B1 | 11/2013 | Holfelder et al. | |
| 8,578,496 B1 | 11/2013 | Krishnappa | |
| 8,600,886 B2 | 12/2013 | Ramavarjula et al. | |
| 8,601,602 B1 | 12/2013 | Zheng | |
| 8,606,694 B2 | 12/2013 | Campbell et al. | |
| 8,630,938 B2 | 1/2014 | Cheng et al. | |
| 8,646,051 B2 | 2/2014 | Paden et al. | |
| 8,705,718 B2 | 4/2014 | Baniak et al. | |
| 8,706,599 B1 | 4/2014 | Koenig et al. | |
| 8,725,613 B1 | 5/2014 | Celka et al. | |
| 8,738,516 B1 | 5/2014 | Dean et al. | |
| 8,745,698 B1 | 6/2014 | Ashfield et al. | |
| 8,751,378 B2 | 6/2014 | Dornhelm et al. | |
| 8,768,914 B2 | 7/2014 | Scriffignano et al. | |
| 8,781,951 B2 | 7/2014 | Lewis et al. | |
| 8,781,953 B2 | 7/2014 | Kasower | |
| 8,782,217 B1 | 7/2014 | Arone et al. | |
| 8,818,888 B1 | 8/2014 | Kapczynski et al. | |
| 8,856,894 B1 | 10/2014 | Dean et al. | |
| 8,930,251 B2 | 1/2015 | DeBie | |
| 8,930,263 B1 | 1/2015 | Mahacek et al. | |

(56) References Cited

U.S. PATENT DOCUMENTS

| | | |
|---|---|---|
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,225,704 B1 | 12/2015 | Johansson et al. |
| 9,230,283 B1 | 1/2016 | Taylor et al. |
| 9,256,904 B1 | 2/2016 | Haller et al. |
| 9,400,589 B1 | 7/2016 | Wasser et al. |
| 9,406,085 B1 | 8/2016 | Hunt, III et al. |
| 9,443,268 B1 | 9/2016 | Kapczynski et al. |
| 9,477,737 B1 | 10/2016 | Charyk et al. |
| 9,483,606 B1 | 11/2016 | Dean et al. |
| 9,536,263 B1 | 1/2017 | Dean et al. |
| 9,542,553 B1 | 1/2017 | Burger et al. |
| 9,542,682 B1 | 1/2017 | Taylor et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0037204 A1* | 11/2001 | Horn ............... G06Q 30/02 705/309 |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0047332 A1* | 11/2001 | Gonen-Friedman . G06Q 20/102 705/40 |
| 2001/0049274 A1 | 12/2001 | Degraeve |
| 2002/0010616 A1 | 1/2002 | Itzhaki |
| 2002/0013827 A1 | 1/2002 | Edstrom et al. |
| 2002/0013899 A1 | 1/2002 | Faul |
| 2002/0029192 A1* | 3/2002 | Nakagawa ............ G06Q 20/10 705/39 |
| 2002/0032635 A1 | 3/2002 | Harris et al. |
| 2002/0033846 A1 | 3/2002 | Balasubramanian et al. |
| 2002/0035480 A1* | 3/2002 | Gordon ............... G06Q 30/02 705/309 |
| 2002/0045154 A1 | 4/2002 | Wood et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0069122 A1 | 6/2002 | Yun et al. |
| 2002/0069182 A1* | 6/2002 | Dwyer ............... G06Q 10/10 705/80 |
| 2002/0072927 A1 | 6/2002 | Phelan et al. |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120757 A1 | 8/2002 | Sutherland et al. |
| 2002/0120846 A1 | 8/2002 | Stewart et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0194120 A1 | 12/2002 | Russell et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2002/0198830 A1* | 12/2002 | Randell ............ G06Q 20/0453 705/40 |
| 2003/0002671 A1 | 1/2003 | Inchalik et al. |
| 2003/0007283 A1* | 1/2003 | Ostwald ................ G11B 15/68 360/92.1 |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2003/0233292 A1* | 12/2003 | Richey ............... G06Q 10/087 705/28 |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0064347 A1 | 4/2004 | VanOrman |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1* | 5/2004 | Burchetta ............ G06Q 10/06 705/80 |
| 2004/0098546 A1 | 5/2004 | Bashant |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |

(56) References Cited

U.S. PATENT DOCUMENTS

| | | |
|---|---|---|
| 2004/0128215 A1 | 7/2004 | Florance et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199789 A1 | 10/2004 | Shaw et al. |
| 2004/0210661 A1 | 10/2004 | Thompson |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230527 A1 | 11/2004 | Hansen et al. |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0010513 A1 | 1/2005 | Duckworth et al. |
| 2005/0015273 A1 | 1/2005 | Iyer |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 * | 4/2005 | Burchetta ............ G06Q 20/10 705/39 |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 * | 7/2005 | Guy ............ G06Q 40/02 705/35 |
| 2005/0154665 A1 | 7/2005 | Kerr |
| 2005/0154769 A1 | 7/2005 | Eckart et al. |
| 2005/0160280 A1 | 7/2005 | Caslin et al. |
| 2005/0171884 A1 | 8/2005 | Arnott |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0031158 A1 | 2/2006 | Orman |
| 2006/0031177 A1 * | 2/2006 | Rule ............ G06Q 10/10 705/309 |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212407 A1 | 9/2006 | Lyon |
| 2006/0212486 A1 | 9/2006 | Kennis et al. |
| 2006/0218407 A1 | 9/2006 | Toms |
| 2006/0223043 A1 | 10/2006 | Dancy-Edwards et al. |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |

(56) References Cited

U.S. PATENT DOCUMENTS

| | | |
|---|---|---|
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0160458 A1 | 7/2007 | Yen |
| 2007/0174186 A1 | 7/2007 | Hokland |
| 2007/0174448 A1 | 7/2007 | Ahuja et al. |
| 2007/0174903 A1 | 7/2007 | Greff |
| 2007/0198432 A1 | 8/2007 | Pitroda et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0220003 A1 | 9/2007 | Chern et al. |
| 2007/0226047 A1 | 9/2007 | Ward |
| 2007/0226122 A1 | 9/2007 | Burrell et al. |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0282743 A1 | 12/2007 | Lovelett |
| 2007/0287415 A1 | 12/2007 | Yamada |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0299770 A1 | 12/2007 | Delinsky |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0097822 A1 | 4/2008 | Schigel et al. |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0133273 A1 | 6/2008 | Marshall |
| 2008/0133278 A1 | 6/2008 | Stanfield |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208735 A1 | 8/2008 | Balet et al. |
| 2008/0212845 A1 | 9/2008 | Lund |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0301016 A1 | 12/2008 | Durvasula et al. |
| 2008/0319889 A1 | 12/2008 | Hammad |
| 2009/0006230 A1 | 1/2009 | Lyda et al. |
| 2009/0018986 A1 | 1/2009 | Alcorn et al. |
| 2009/0024484 A1 | 1/2009 | Walker et al. |

(56) References Cited

U.S. PATENT DOCUMENTS

| | | |
|---|---|---|
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055322 A1 | 2/2009 | Bykov et al. |
| 2009/0055404 A1 | 2/2009 | Heiden et al. |
| 2009/0064297 A1 | 3/2009 | Selgas et al. |
| 2009/0089190 A1 | 4/2009 | Girulat |
| 2009/0089193 A1 | 4/2009 | Paintin |
| 2009/0089869 A1 | 4/2009 | Varghese |
| 2009/0094237 A1 | 4/2009 | Churi et al. |
| 2009/0094675 A1 | 4/2009 | Powers |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164929 A1 | 6/2009 | Chen et al. |
| 2009/0171723 A1 | 7/2009 | Jenkins |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222527 A1 | 9/2009 | Arconati et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0077483 A1 | 3/2010 | Stolfo et al. |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0217837 A1 | 8/2010 | Ansari et al. |
| 2010/0223160 A1 | 9/2010 | Brown |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0323446 A1 | 12/2010 | Barnett et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0023115 A1 | 1/2011 | Wright |
| 2011/0029388 A1 | 2/2011 | Kendall et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |

(56) References Cited

U.S. PATENT DOCUMENTS

| | | |
|---|---|---|
| 2011/0113084 A1 | 5/2011 | Ramnani |
| 2011/0113086 A1 | 5/2011 | Long et al. |
| 2011/0113096 A1 | 5/2011 | Long et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1* | 6/2011 | Nonaka ............ G06Q 20/10 705/30 |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0214187 A1 | 9/2011 | Wittenstein et al. |
| 2011/0252071 A1 | 10/2011 | Cidon |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0276396 A1 | 11/2011 | Rathod |
| 2011/0296003 A1 | 12/2011 | McCann et al. |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0320582 A1 | 12/2011 | Lewis |
| 2012/0005070 A1 | 1/2012 | McFall et al. |
| 2012/0005542 A1 | 1/2012 | Petersen et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136768 A1 | 5/2012 | DeBie |
| 2012/0136774 A1 | 5/2012 | Imrey et al. |
| 2012/0151045 A1 | 6/2012 | Anakata et al. |
| 2012/0151046 A1 | 6/2012 | Weiss et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0195412 A1 | 8/2012 | Smith |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0262472 A1 | 10/2012 | Garr et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0290660 A1 | 11/2012 | Rao et al. |
| 2012/0290740 A1 | 11/2012 | Tewari et al. |
| 2012/0297484 A1 | 11/2012 | Srivastava |
| 2012/0317014 A1 | 12/2012 | Cerise et al. |
| 2012/0324388 A1 | 12/2012 | Rao et al. |
| 2013/0006843 A1 | 1/2013 | Tralvex |
| 2013/0006844 A1 | 1/2013 | Kremen |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0066775 A1 | 3/2013 | Milam |
| 2013/0080467 A1 | 3/2013 | Carson et al. |
| 2013/0085804 A1 | 4/2013 | Leff et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0185293 A1 | 7/2013 | Boback |
| 2013/0187923 A1 | 7/2013 | Yoshimoto et al. |
| 2013/0205135 A1 | 8/2013 | Lutz |
| 2013/0211986 A1 | 8/2013 | Debie et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0293363 A1 | 11/2013 | Plymouth |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0098229 A1 | 4/2014 | Lu et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279391 A1 | 9/2014 | Gallo et al. |
| 2014/0298485 A1 | 10/2014 | Gardner |
| 2014/0317023 A1 | 10/2014 | Kim |
| 2014/0379554 A1 | 12/2014 | Grossman et al. |
| 2015/0178829 A1 | 6/2015 | Weiss |
| 2015/0310543 A1 | 10/2015 | DeBie |
| 2015/0324920 A1 | 11/2015 | Wilson et al. |
| 2015/0326580 A1 | 11/2015 | McMillan et al. |

FOREIGN PATENT DOCUMENTS

| | | |
|---|---|---|
| EP | 1 301 887 | 4/2003 |
| EP | 1 850 278 | 10/2007 |
| EP | 2 088 743 | 8/2009 |
| GB | 2 102 606 | 2/1983 |
| JP | 2005-208945 | 8/2005 |

(56) References Cited

FOREIGN PATENT DOCUMENTS

| KR | 10-2000-0063313 | 11/2000 |
|---|---|---|
| KR | 10-2002-0039203 | 5/2002 |
| KR | 10-2007-0081504 | 8/2007 |
| WO | WO 91/16691 | 10/1991 |
| WO | WO 00/55778 | 9/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

Managerial Third-party dispute intervention: A prescriptive model of strategy selection. Elangovan, A R. Academy of Management Review v20n4 pp: 800-830 Oct. 1995.*
U.S. Appl. No. 12/705,489, filed Feb. 12, 2010, Bargoli et al.
U.S. Appl. No. 12/705,511, filed Feb. 12, 2010, Bargoli et al.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Application as filed in U.S. Appl. No. 09/411,683, dated Oct. 4, 1999.
"Arizona Company Has Found Key in Stopping ID Theft," PR Newswire, New York, Aug. 10, 2005 http://proquest.umi.com/pgweb?did=880104711&sid=1&Fmt=3&clientId=19649&ROT=309&Vname=POD.
ABC News Now: Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/; printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/lym/reviews/equifax/debt-wise/, Jan. 2010, pp. 11.
Equifax; "Places", http://web.archive.org/web/20111111113930/http://equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.

(56) References Cited

OTHER PUBLICATIONS

Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W&VR=2.0 as printed Dec. 17, 2009, pp. 5.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.credtcards.com/credit-card-news/identity-ID-theft-and-kids-children-1282.php, pp. 4.
"GLBA Compliance and FFIEC Compliance" http://trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pgdweb?did=852869731&sid=1&Fmt=3&clientId=19649&ROT=309&Vname=POD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://lboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gciid=CJgZIZP7paUCFYK5KgodbCUJJO printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
"Judging Credit: Consumers Need Better Finance Tools", News Journal, Daytona Beach, FL, Dec. 28, 2002.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.

(56) References Cited

OTHER PUBLICATIONS

"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display-faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.corn/how-it-works.jsps printed Apr. 3, 2012 in 3 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 pages.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP-Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Planet Receipt—Home, htt://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_gif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, http://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.

(56) References Cited

OTHER PUBLICATIONS

Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_chid_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Peltier, Jon, "Conditional Formatting of Excel Charts", Peltier Tech Blog, as posted Feb. 13, 2012, http://peltiertech.com/conditional-formatting-of-excel-charts/, pp. 1-5.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
Lauwers et al., "Five Hundred Years of Bookkeeping: A Portrait of Luca Pacioli", Tijdschrift voor Economie en Management, 1994, vol. 39. No. 3, pp. 289-304.
MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.

* cited by examiner

Credit Dispute Resolution

FILE EDIT VIEW FAVORITES TOOLS HELP

ADDRESS http://www.CreditDisputeResolution.com/StatusViewer/Claim2012 | GO

CREDIT DISPUTE RESOLUTION

1. Name: Joe Smith
2. Address: 2000 West Harbor St.
3. City, State, Zip: San Luis Obispo, CA 93107

Balance: $1,746.07

BIG CREDITOR
PLATINUM CREDIT CARD
5555444433332222111100
PO BOX 1649, DENVER CO 80001
(877)-999-9999

Case Status: Resolved.

Submit Your Successful Dispute Resolution Results to the Following Credit Bureaus ✓ Credit Bureau 1 ~ 805

✓ Credit Bureau 2 ~ 810

SUBMIT

SYSTEM AND METHODS FOR CREDIT DISPUTE PROCESSING, RESOLUTION, AND REPORTING

LIMITED COPYRIGHT AUTHORIZATION

A portion of disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

Credit disputes may arise when a consumer does not agree with a creditor regarding charges, timeliness of payments, fraudulent activities, and so forth. Credit disputes may also arise if a consumer believes that information submitted by a creditor to a credit bureau is inaccurate or does not reflect the most current status of a credit situation.

A common type of credit dispute happens when a consumer's identity, including credit information, is stolen and used to make purchases or apply for credit lines. The consumer may inform a creditor that such charges are results of fraudulent activities, and as such the consumer should not be held responsible for them.

SUMMARY

Among other things, this disclosure describes systems and methods for tracking statuses of credit disputes, informing the status of credit dispute resolution to consumers, and informing consumers of whether a creditor has responded to a credit dispute resolution request within a regulatory response period.

As discussed herein, aspects of the present disclosure include a credit dispute resolution computer system. The computer system may include one or more computer processors and a tangible storage device which stores a credit dispute resolution module configured for execution by the one or more computer processors. The credit dispute resolution module may be configured to receive a credit dispute resolution request from a consumer. In response to the request from the consumer for information regarding resolution status of the credit dispute, the credit dispute resolution module may generate user interface code configured for execution on a computing device of the consumer in order to render a user interface. The user interface may include a status interface including indicators of a plurality of required actions associated with resolution of the received credit dispute. The plurality of required actions may include at least: credit dispute request received, credit dispute case sent to credit bureau, credit dispute case acknowledged by creditor and creditor replies to credit dispute request. The user interface may also include a current status indicator indicating which of the required action is in process at a time the request for the resolution status is received.

As described herein, aspects of the present disclosure include a credit dispute resolution computer system that includes one or more computer processors, a data storage configured to store a plurality of records which includes credit disputes from respective consumers, and a tracking and reporting module. The tracking and reporting module may be configured to receive a request to resolve a credit dispute between a consumer and a creditor and check the credit dispute for accuracy of information in the credit dispute. The information may include one or more of the consumer's name, address, social security number, one or more accounts with the creditor, and/or payment information. The tracking and reporting module may also send a credit dispute request to a credit bureau, receive one or more case status updates from the credit bureau regarding the credit dispute resolution request, determine a resolution status of a plurality of resolution statuses that applies to the credit dispute of the consumer based on the received case status. The credit dispute resolution computer system may also include an alert module configured to notify the consumer of the determined resolution status, notify the consumer of an average response time by the creditor and/or a regulatory response time requirement, and in response to determining that no response has been received from the creditor within the regulatory response time, provide the consumer with information to help the consumer obtain a response from the creditor.

Aspects of the present disclosure include a computer-implemented method for credit dispute resolution. The computer-implemented method may include receiving a credit dispute request from a consumer. Furthermore, in response to a request from the consumer for information regarding resolution status of the credit dispute, the computer-implemented method may determine a current status indicating which of a plurality of required action is in process at a time the request for the resolution restates is received. The plurality of required actions may include at least: credit dispute request received, credit dispute case sent to a credit bureau, credit dispute case acknowledged by creditor, and creditor replies to credit dispute request. The computer-implemented method may also include determining an average response time for the creditor based on one or more actual response times for the creditor in credit dispute requests of other consumers and a regulatory response time for the creditor to respond to the credit dispute case once received by the creditor. The computer-implemented method may also include determining whether the creditor has responded to the credit dispute request within the regulatory response time.

Aspects of the present disclosure include a non-transitory computer-readable storage medium, which includes computer-executable instructions that direct a computing system to receive a credit dispute request from a consumer. In response to a request from the consumer for information regarding resolution status of the credit dispute, the computer-executable instructions may generate user interface code configured for execution on a computing device of the consumer in order to render a user interface. The user interface may include a status interface including indicators of a plurality of required actions associated with resolution of the received credit dispute. The plurality of required actions may include at least: credit dispute request received, credit dispute case sent to credit bureau, credit dispute case acknowledged by creditor and creditor replies to credit dispute request. The user interface may also include a current status indicator indicating which of the required actions is in process at a time the request for the resolution status is received.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 8 is an illustrative user interface that may be generated and presented to a consumer, which allows the consumer to submit a successfully resolved dispute to other credit bureaus and/or credit dispute services.

DETAILED DESCRIPTION

Various embodiments of systems, methods, processes, and data structures will now be described with reference to the drawings. Variations to the systems, methods, processes, and data structures which represent other embodiments will also be described. Certain aspects, advantages, and novel features of the systems, methods, processes, and data structures are described herein. It is to be understood that not necessarily all such advantages may be achieved in accordance with any particular embodiment. Accordingly, the systems, methods, processes, and/or data structures may be embodied or carried out in a manner that achieves one advantage or group of advantages as taught herein without necessarily achieving other advantages as may be taught or suggested herein.

Credit disputes may arise when a consumer does not agree with a creditor regarding charges, timeliness of payments, fraudulent activities, and so forth. Credit disputes may also arise if a consumer believes that information submitted by a creditor to a credit bureau is inaccurate or does not reflect the most current status of a credit situation.

A common type of credit dispute happens when a consumer's identity, including credit information, is stolen and used to make purchases or apply for credit lines. The consumer may inform a creditor that such charges are results of fraudulent activities, and as such the consumer should not be held responsible for them.

Other common credit disputes include whether payments are late, how much fees and other charges are owed, whether merchants have overcharged, whether an interest rate is correct, and so forth.

Example Credit Reporting Environment and Data Flow

Figure 1:
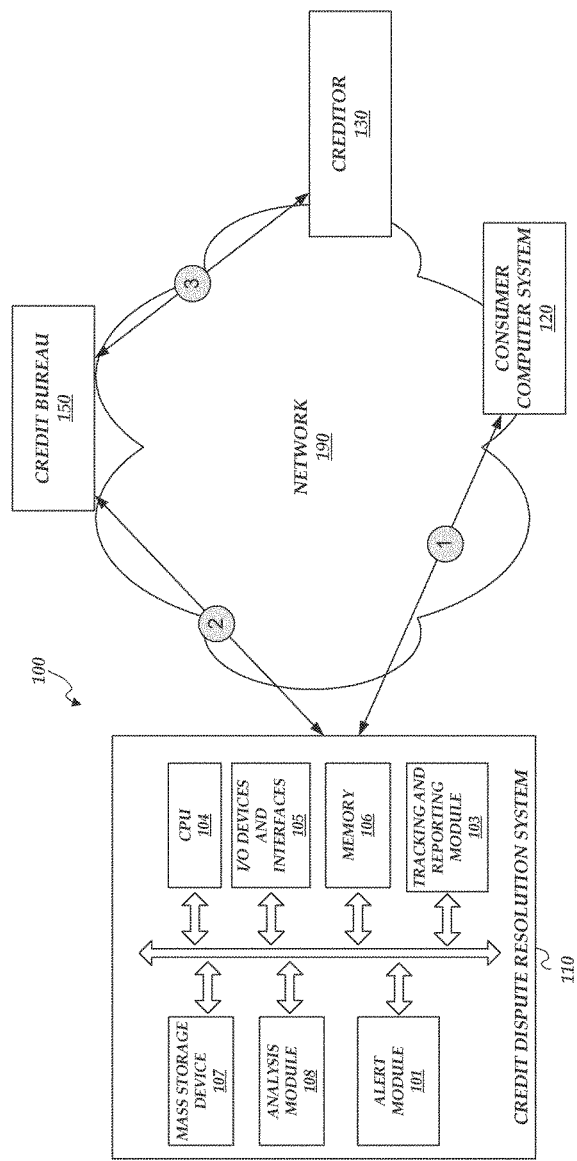
FIG. 1 is a flow diagram illustrating one embodiment of an illustrative operating environment for receiving, processing, monitoring, and reporting credit disputes and resolution of the credit disputes.

FIG. 1 is a flow diagram illustrating one embodiment of an illustrative operating environment 100 for receiving, processing, monitoring, and reporting credit disputes and resolution of the credit disputes. In the example of FIG. 1, circled numerals illustrate the order in which data flows between the various components according to one embodiment. In other embodiments, the processes associated with the circled numerals may be performed in a different order, and the method may include fewer or additional processes.

Consumer computer system 120 may include computer systems of individual consumers who have individual credit accounts, businesses that have business credit accounts, homeowners who have taken out loans or home equity lines of credits, and/or consumers or businesses that have purchased vehicles with loans, and so forth. As illustrated, the consumer computer system 120 is in contact with the credit dispute resolution system 110 via a network 190.

In step 1 of FIG. 1, the credit dispute resolution system 110 receives information related to a consumer's credit dispute from the consumer computer system 120. For example, a consumer fills out a credit dispute form provided by the credit dispute resolution system, such as a form that may be accessible via an online credit report of the consumer. The credit dispute resolution system 110 may also receive receipts, payment stubs, proof of purchase, and/or other types of documents from the consumer computer system 120.

In the embodiment of FIG. 1, the credit dispute resolution system 120 is in contact with a credit bureau 150 and/or other provider of credit data. In some embodiments, the credit dispute resolution system 120 may be in contact with more than one credit bureaus 150 and/or credit dispute resolution services. In step 2 of FIG. 1, the credit dispute resolution system 120 sends information regarding the credit dispute to the credit bureau 150. In some embodiments, the credit dispute information may include the received credit dispute from consumer computer system 120, receipts, payment stubs, proof of purchase, and/or a standardized inquiry incorporating information related to the credit dispute formatted by the credit dispute resolution system. The information may also include a request for the credit bureau 150 to send status updates, status updates regarding the credit dispute, and result of credit dispute resolution, an/or other updates. Furthermore, in some embodiments, the information may include user preferences for delivery of status updates and/or alerts regarding the credit dispute.

The tracking and reporting module 103 may keep track of when credit dispute information is submitted to a credit bureau 150. The tracking and reporting module 103 may also receive, process, and/or store status updates regarding the submitted credit dispute. The tracking and reporting module 103 may also receive, process, and/or record how many days have passed since a creditor has received a credit dispute resolution request.

In some embodiments, the alert module 101 generates alerts that may be sent to the consumer. The alert module 101 may be in communication with the tracking and reporting module 103. Based on the information and/or reports provided by the tracking and reporting module 103, the alert module 101 may inform the consumer computer system 120 of the recent updates to the credit dispute. The alert module 101 may also send messages and/or emails and letters to the consumer. The alert module 101 may also communicate with the I/O devices and interfaces 105 to generate one or more graphical interfaces in order to provide various statuses and alerts to the consumer, some of which are discussed in more details below.

In some embodiments, the credit dispute resolution system 110 also calculates an average response time for respective creditors. For example, the analysis module 108 may collect information regarding the creditor 130, such as credit information associated with a plurality of consumers that each have filed disputes with the creditor, and calculate the average number of days that that the particular creditor 130 typically takes to respond to a credit dispute. Thus, the analysis module 108 may determine average response times for individual creditors based on actual resolutions of (or failure to resolve) disputes with multiple consumers. In some embodiments, the analysis module 108 may perform a more detailed calculation, such as the average response time based on the type of dispute (e.g., late payment, identity dispute, and so forth) or the average response time based on the type of credit involved (e.g., individual or business, interest rate categories).

In the embodiment of FIG. 1, the credit bureau 150 is in contact with the creditor 130 that is related to the credit dispute. In some embodiments, the credit bureau may be in contact with one or more creditors that are related to the credit dispute. In some embodiments, the credit bureau 150 may send the credit dispute to the creditor 130 along with a request that the creditor responds to the credit dispute within a regulatory response time frame. In some embodiments, the credit bureau may verify the identity of the consumer and the past credit history of the consumer specifically regarding the disputed credit account before sending the credit dispute to the creditor.

In the embodiment of FIG. 1, the creditor 130 sends information regarding the credit dispute to the credit bureau 150 and the credit bureau passes on some or all of the information to the credit dispute resolution system. In some embodiments, the credit dispute resolution system 110 is under the control or and/or owed by the credit bureau 150.

Status messages provided by the creditor to the credit bureau may include any combination of information regarding the dispute. For example, in some situations, the creditor 130 may inform the credit bureau 150 that it has tried to resolve the credit dispute but it cannot resolve it successfully after investigation. The creditor 130 may inform the credit bureau that a partial solution to the credit dispute may be found but there could be other requirements from the creditor to the consumer. In some situations, the credit dispute may be successfully resolved without further actions. In some situations, the creditor 130 may inform the credit bureau 150 that more information or documents are needed in order to further investigate the dispute. In some situations, the creditor 130 may not respond to the credit bureau 150 within the regulatory time frame, and the credit bureau 150 may inform the credit dispute resolution system 110 of the creditor's non-compliance with the regulatory time frame. The credit dispute resolution system 110 may inform the consumer of the non-compliance, and in some embodiments, may also direct the consumer to take further actions, as discussed in more details below.

Example Methods Related to Incoming Credit Disputes

Figure 2:
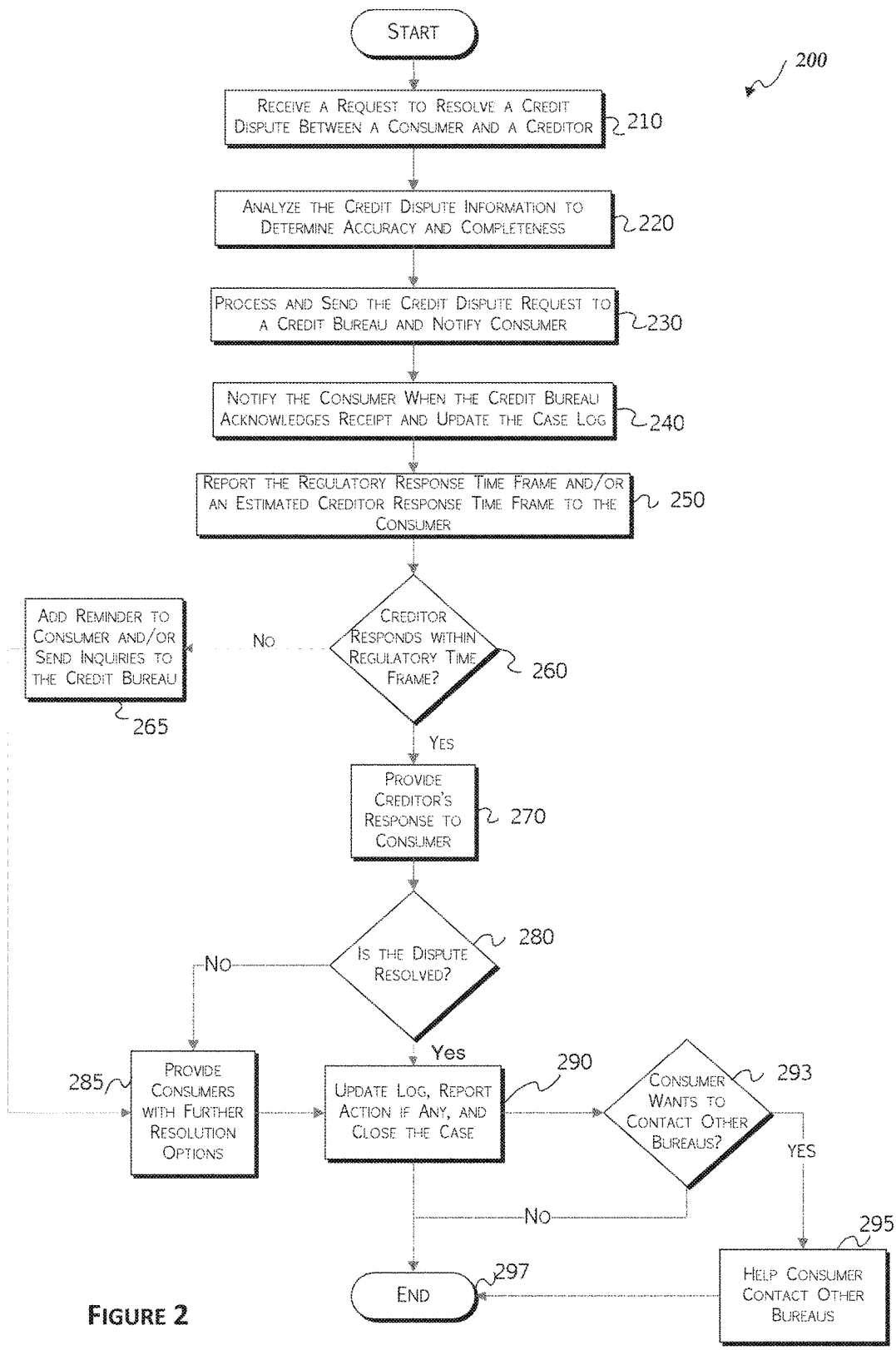
FIG. 2 is a flowchart that illustrates one embodiment of a method of sending a credit dispute to a credit bureau and reporting the status updates of credit dispute resolution to a consumer.

FIG. 2 is a flowchart illustrating one embodiment of a method of sending a credit dispute to a credit bureau 150 and reporting the status updates regarding credit dispute resolution to a consumer. The method of FIG. 2 may be performed by the credit dispute resolution system 110, certain modules of the system 110, and/or any other suitable computing system. Depending on the embodiment, the method of FIG. 2 may include fewer or additional blocks and the blocks may be performed in an order that is different than illustrated.

The method 200 begins at block 210, where the credit dispute resolution system 110 receives a request to resolve a credit dispute between a consumer and a creditor 130. As discussed above, the received credit dispute may include consumer credit data, business data, account history, financial statements, public records, vehicle loan records, property information, mortgage information, and/or other types of data. The received data may include, for example, credit card payment history of a consumer or a business, merchandise purchase information at a store, payment information regarding a home equity line of credit, and so forth. In some embodiments, the data may include data that the credit dispute resolution system 110 specifically requests from the consumer computer system 120, such as proof of payment, proof of purchase, and so forth. The data may also include non-credit data which can be directly or indirectly linked or tied to a consumer and/or business.

The method 200 proceeds to block 220, where the credit dispute resolution system 110 processes the received credit dispute information. In some embodiments, the credit dispute resolution system 110 may check the request for accuracy and completeness. For example, the credit dispute resolution system 110 may determine if the customer's name, address, and social security number match the one or more accounts the customer has with the creditor. In some embodiments, the credit dispute resolution system 110 may correct mistakes in the submitted information. For example, if the consumer has misspelled the name of the creditor, the credit dispute resolution system 110 may correct the mistake and/or ask the consumer to correct the mistake. In some embodiments, the analysis module 108 may determine, based on the submitted credit dispute, the category that the dispute falls into. For example, the analysis module 108 may generally categorize the submitted credit dispute into disputes regarding incorrect identity-related information, identity theft, late or missed payments, interest rate disputes, fee/charge disputes, and so forth. In some embodiments, the category information may be part of the credit dispute information received from the consumer.

In some embodiments, if some key information, for example, the account number of credit account in dispute, is missing or incorrect, the credit dispute resolution system may ask the consumer to provide more information in order to complete the credit dispute resolution request. In some embodiments, if the missing or incorrect information may be completed or corrected by the analysis module 108 based on the information stored in the mass storage device 107, then the analysis module 108 may also automatically correct or complete the missing information.

The method 200 proceeds to block 230, where the credit dispute resolution system 110 processes the received credit dispute information into a credit dispute resolution request, and send the request to a credit bureau 150 (or multiple credit bureaus). The consumer may be notified when the request is sent to the credit bureau. In some embodiments, the credit dispute resolution system 110 may format the received credit dispute information into a credit dispute resolution request. The formatting involved may include gathering the received credit dispute information, extract data fields that involve the identifying information about the consumer, dates of events, details of the dispute, and so forth. The extracted data may be different depending on the type of credit dispute.

In some embodiments, the formatted credit dispute resolution request may be in the form of a letter to the credit bureau. In some cases, the formatted credit dispute resolution request may be in the form of a series of data fields that may be loaded into a database or other data structure. In some other cases, the credit formatted credit dispute resolution request may be a pre-determined format, such as XML, Excel, etc.

The method 200 proceeds to block 240, where the credit dispute resolution system 110 notifies the consumer when the credit bureau acknowledges receipt of the credit dispute resolution request. The credit dispute resolution 110 may also update a case log, which is configured to reflect the updates to the credit dispute resolution request. The alert module 108 may notify the consumer by a text message, an email, or by a message or a graphical indicator displayed to the consumer when the consumer logs onto a portal provided by the dispute resolution system for tracking status of the submitted dispute.

The method 200 proceeds to block 250, where the credit dispute resolution system 100 may report a regulatory response time frame and an estimated creditor response time frame to the consumer. In some embodiments, a regulatory response time frame is the number of days within which the creditor is required to respond to an inquiry by law. In some embodiments, analysis module 108 may determine the average creditor response time frame to the consumer based on information stored in the credit dispute resolution system 110 (such as in the mass storage device 107). In some embodiments, the regulatory response time frame may be determined based on relevant state and Federal laws, such as Fair credit Reporting Act (FCRA). In some embodiments, the regulatory response time frame may be 30 days.

The method 200 proceeds to decision block 260, where the credit dispute resolution system 110 determines whether the creditor has responded within the regulatory time frame. For example, if the regulatory response time frame is 30 days, then the credit dispute resolution system 110 makes a determination whether the creditor has responded to the credit dispute resolution request within 30 days. In some embodiments, in order to satisfy the regulatory response time frame, the response may be an initial response or acknowledgement with some stated further planed action from the creditor.

If the answer to the decision block 260 is no and the creditor has not responded within the regulatory response time frame, then the credit dispute resolution system 110 proceed to bock 265. The credit dispute resolution system 110 may send a message to the consumer that the creditor has not responded within the regulatory time frame, and/or send further inquiries to the credit bureau. In some embodiments, the credit bureau may notify the creditor that a response should be submitted within the regulatory time frame. In a user interface provided to the consumer, which will be described in detail later, a status message or a status bar may also be shown to the consumer and let the consumer know that the creditor has not responded within the regulatory time frame.

If the creditor has responded within the regulatory time frame, the method 200 proceeds to decision block 270, where the credit dispute resolution system 110 provides the creditor's response to the consumer. The response from the creditor may be provided by the consumer via the alert module 101. In some embodiments, the response may be provided by one or more of text messages, emails, letters, and/or phone calls. In a user interface provided to the consumer, which will be described in detail later, a status message or a status bar may also be shown to the consumer and let the consumer know that the creditor has responded within the regulatory time frame. Moreover, the response from the creditor may also be displayed in the user interface.

In some embodiments the method includes blocks similar to blocks 260, 265, and 270, but with reference to an expected time frame for the particular creditor. For example, if a particular creditor is expected to respond within 14 days (e.g., based on a 14-day average response time in hundreds or thousands of previous disputes), the dispute resolution system may notify the consumer when the time period has lapsed without a response and/or communicate with the creditor in an attempt to expedite the process.

The method 200 proceeds to decision block 280, where it is determined whether the dispute has been resolved. In some embodiments, the analysis module 108 may analyze the received response from the creditor and determines whether the dispute has been resolved. In some other embodiments, information regarding whether the dispute has been resolved may be received from either the creditor or the credit bureau. In other embodiments, the dispute is not considered resolved until input from the consumer indicates that the dispute has been resolved (e.g., regardless of whether information from the creditor indicates that the dispute is resolved.

If the answer is no at block 280 in view of the dispute not being resolved successfully, the method 200 proceeds to block 285, and provides consumers further resolution options. In some embodiments, the credit dispute resolution system 110 provides the consumers with direct contact information of the creditor and/or the credit bureau, such as phone numbers and/or email addresses. In some embodiments, the credit dispute resolution system 110 provides the consumers with a list of options or alternatives to try. In some embodiments, the credit dispute resolution system 110 may inform the consumer to send more information to the creditor or credit bureau.

The method 200 then proceeds to block 290, either after a determination of successful resolution in block 280 or providing options to the consumer at block 285. The credit dispute resolution system 110 may update the case status log to reflect the resolution status (e.g., successful or unsuccessful resolution and/or details regarding the dispute). The credit dispute resolution system 110 may also report the resolution to the consumer. In some embodiments, the credit dispute resolution system 110 closes the credit dispute resolution request after receiving the indication of successful resolution form the creditor.

In the embodiment of FIG. 2, the method 200 proceeds to decision block 293, where it is determined if the consumer would like to contact other credit bureaus or credit dispute resolution services. If the answer is yes, then the method 200 proceeds to block 295, and the credit dispute resolution system 110 may help the consumer contact other credit bureaus. In some embodiments, the credit dispute resolution system 110 may send information to other credit bureaus and/or credit dispute resolution services that may be useful to resolve other potential discrepancies in the consumer's financial data maintained by those other entities. The transmitted information may include, for example, the consumer's credit dispute resolution request, the consumer's ID data, the consumer's other necessary credit data, the results of the resolution, and/or any other details regarding the dispute.

After the credit dispute resolution system 110 has finished performing any actions in block 295, or if the answer to the question in decision block 293 is no (that the consumer does not what to contact other credit bureaus or services), then the method 200 may proceed to block 297 and ends the process.

Example User Interfaces and Status Blocks

Figure 3:
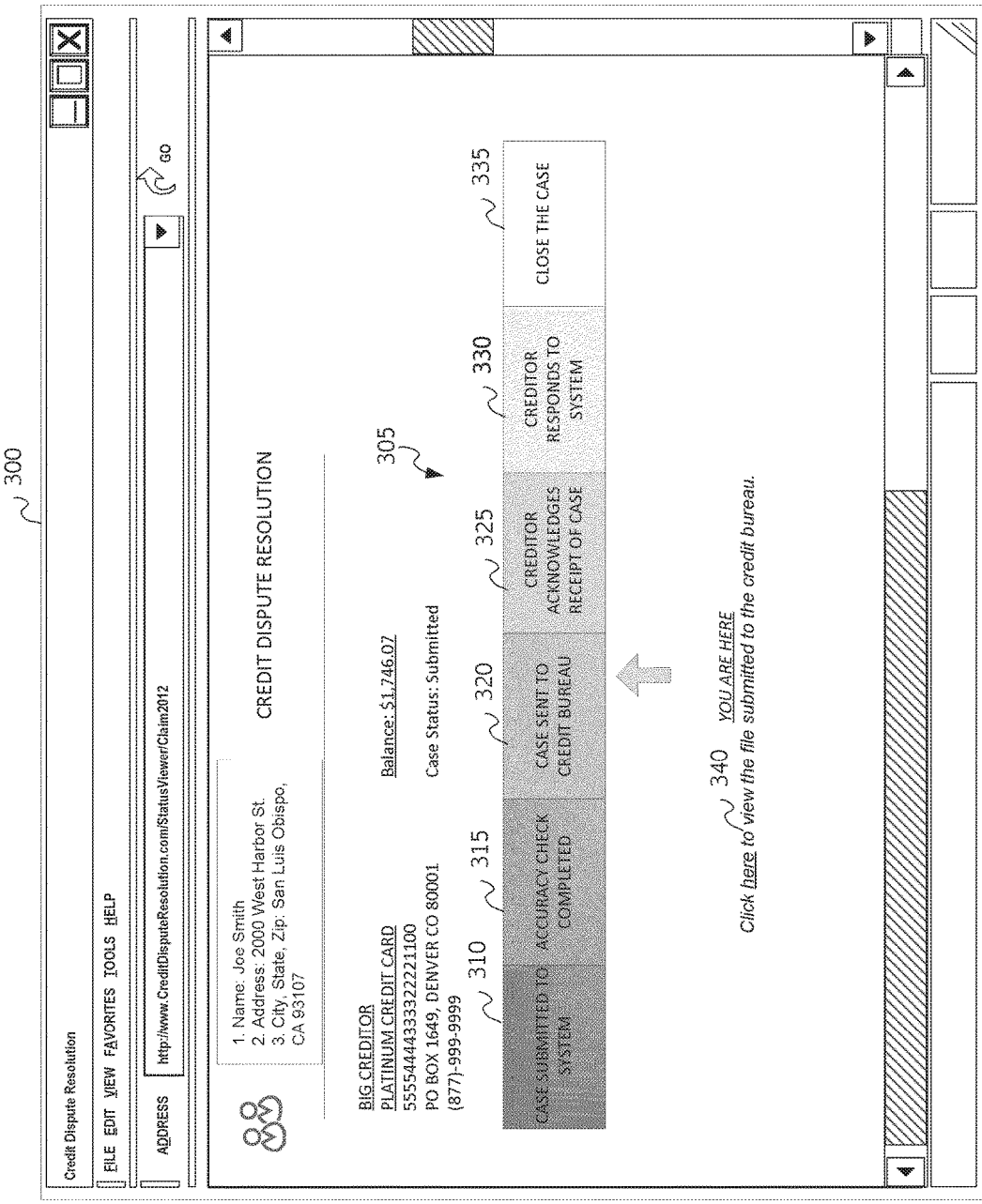
FIG. 3 is an illustrative user interface that may be generated and presented to a consumer, which includes a credit dispute resolution status monitoring interface indicating that a case has been sent to a credit bureau.

FIG. 3 is an illustrative user interface that may be generated and presented to a consumer, which includes a credit dispute resolution status monitoring interface 300 indicating a case has been sent to a credit bureau.

The interface 300 may display the consumer's identification information. In this particular example, the consumer's name and address are displayed. In other embodiments, the consumer's phone number, birth date, and/or the last few digits of the consumer's social security number may also be displayed.

The interface 300 may also display the complete or partial account number of the account that is involved in this credit dispute. In some embodiments, the balance of the account, and the contact information of the creditor may also be displayed.

The interface 300 may display the status of the credit dispute resolution request. For example, in FIG. 3, the case status is shown as "submitted." More details about the status may be displayed in the status bar 305 below. Several blocks representing the process of dispute resolution may be arranged to display the case status to the consumer. For example, in the interface 300, an arrow points to the block 320 of the status bar 305, which shows that the case has been sent to the credit bureau. The arrow with the words "You are here" may be used to point to the block most closely associated with a current status of the consumer's credit dispute. In the interface 300, block 310 indicates that the case has been submitted to the credit dispute resolution system, block 315 indicates that an accuracy check of the submitted credit dispute has been completed, block 325 indicates that the creditor has acknowledged receipt of the dispute, block 330 indicates that the creditor should be responding to the system, and block 335 shows that the dispute has been closed. In other embodiments, fewer and/or additional blocks may be included to illustrate fewer and/or additional status associated with a credit dispute resolution process. Advantageously, the consumer not only sees the current status of their credit dispute resolution process, which may be updated in realtime, the consumer also sees the steps that have already been completely and knows what additional steps are required before the case is close. With reference to the example of FIG. 3, the consumer can see that a couple of actions (those associated with blocks 325 and 33) remain before the case is closes at block 335.

In some embodiments, a link 340 may be provided in the interface 300. In FIG. 3, for example, if the consumer follows the link 340, the consumer may view the file summarizing the credit dispute, such as documents that were submitted to the credit bureau and/or documents sent to/from the creditor.

Figure 4:
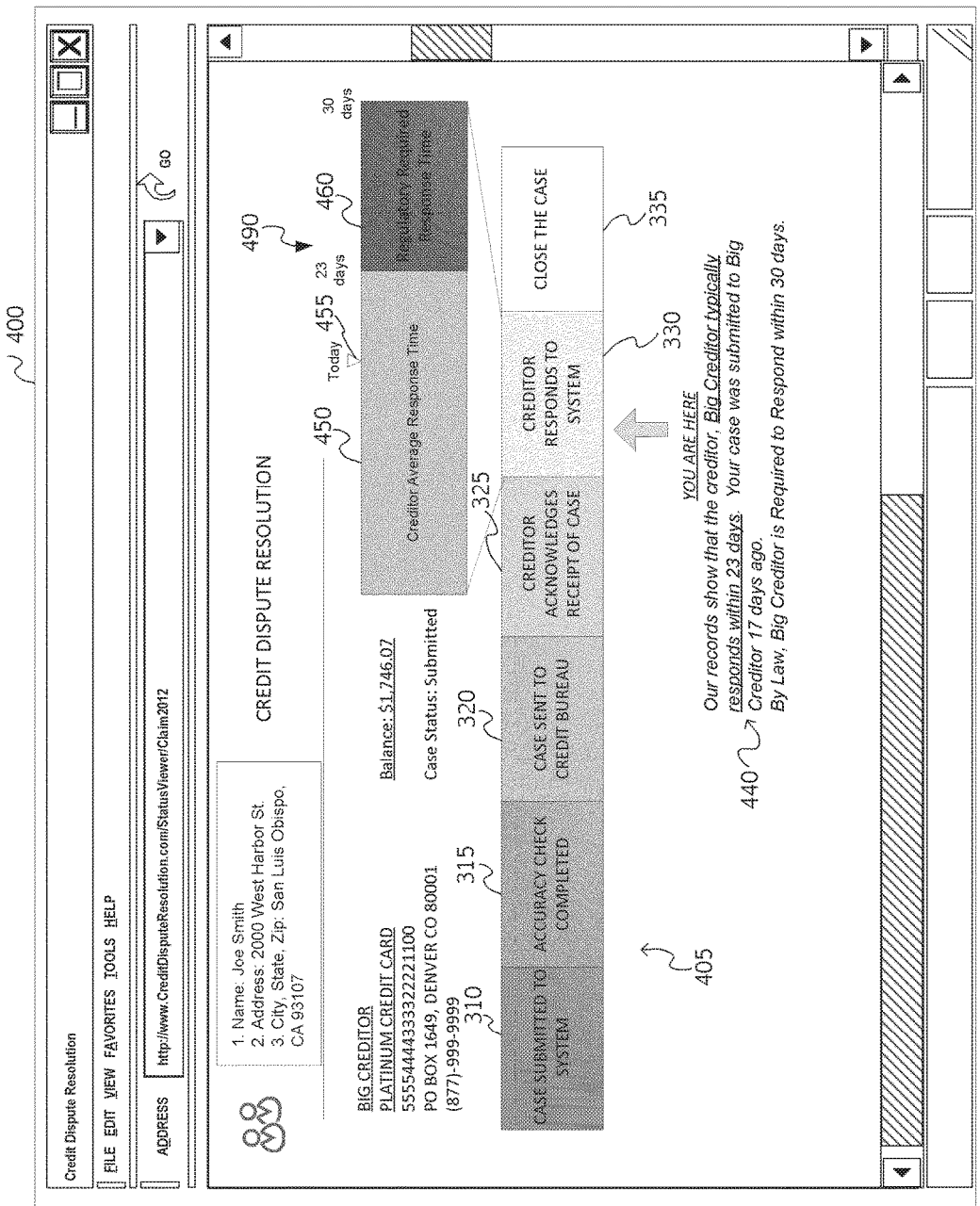
FIG. 4 is an illustrative user interface that may be generated and presented to a consumer, which includes an indication of creditor average response times and regulatory creditor response times.

FIG. 4 is an illustrative user interface 400 that may be generated and presented to a consumer, which includes an indication of creditor average response times and regulatory creditor response times. Similar to the illustrative interface in FIG. 3, the interface 400 may display the consumer's identification information.

In FIG. 4, the case status is shown as "submitted." More details about the status may be displayed in the status bar 405 below. For example, in the interface 400, a status arrow points to block 330 of the status bar 405, which shows that the case has been acknowledged by the creditor and the creditor should be responding to the system. In this embodiment, the status is determined based on the location of the status arrow below the status bar 405 (labeled "YOU ARE HERE"), which generally indicates that tasks to the left of the arrow have been completed and the task that the arrow is pointing to is in process. In this example, a message is shown next to "You are here," which indicates when a creditor usually responds to a credit dispute resolution request, how long the request has been submitted to the creditor, and the regulatory response timeline. In other embodiments, less or additional information may be displayed. For example, dates when be displayed next to each task to indicate when it was started, completed, and/or expected to be completed. In this example, the displayed message indicates that Big Creditor typically responds to credit disputes within 23 days, the particular consumer case was submitted to Big Creditor 17 days ago, and, by law, Big Creditor is required to respond within 30 days.

In some embodiments of FIG. 4, a second status bar 490 with additional blocks can be displayed to provide additional details regarding one or more blocks of the status bar 405. In this example, the second status bar 490 may include a block 450 indicating a creditor's average response time and a block 460 indicating an additional time (beyond the creditor's average response time) until a regulatory response deadline is reached. An indicator 455 may indicate where today is in view of the creditor's average response time 450 and the regulatory response time 460.

In some embodiments, a link 440 may be provided in the interface 400. In FIG. 4, for example, if the consumer follows the link 440, the consumer may view information regarding Big Creditor's response time, such as a message, a file, and/or a webpage of statistics of a creditor's average response time. The creditor's average response time and historical average response time may be displayed as a graph and/or a chart. The amount of time that has passed since the creditor has received a current credit dispute resolution request may also be compared to the creditor's average response time and historical average response time. In some embodiments, probabilities of whether a creditor may respond within some number of days may also be provided. In other embodiments, fewer and/or additional blocks may be included to illustrate fewer and/or additional status associated with a credit dispute resolution process.

Figure 5:
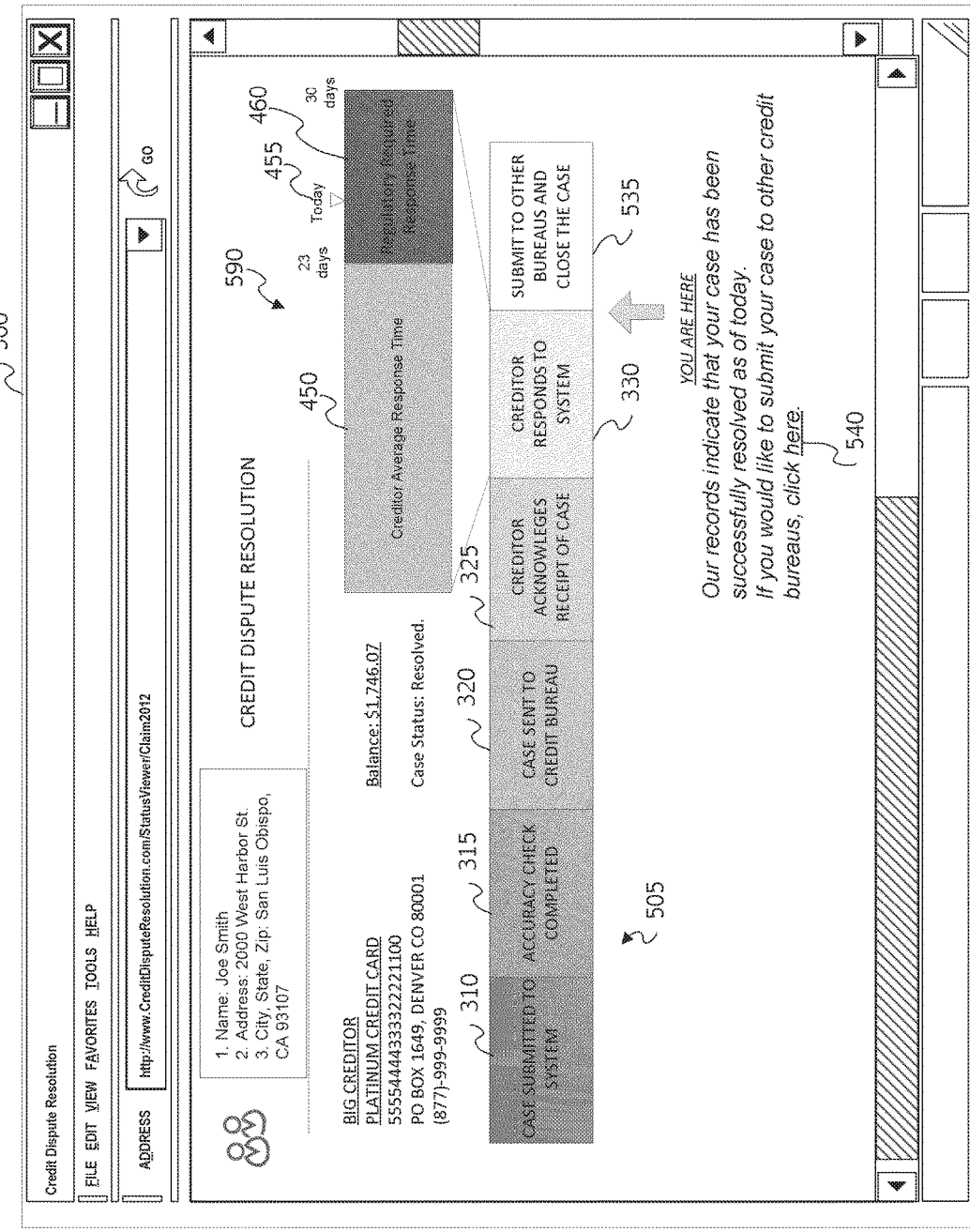
FIG. 5 is an illustrative user interface that may be generated and presented to a consumer, which includes an indication that a case has been successfully resolved and providing an option to provide resolution information to other credit bureaus and/or credit dispute services.

FIG. 5 is an illustrative user interface 500 that may be generated and presented to a consumer, which includes an indication that a case has been successfully resolved and providing an option to provide resolution information to the credit bureaus and/or credit dispute services.

In FIG. 5, the case status is shown as "resolved." In this example, the status arrow (below the status bar 505) points to the end of block 330 and the beginning of block 535 of the status bar 505, indicating that a creditor has already responded to the credit bureaus regarding the dispute, and the next step may be to send the resolved dispute to other credit bureaus and close the case.

As with FIG. 4, the status arrow with the words "You are here" may be used to point to the block most closely associated with a current status of the consumer's credit dispute. In this example, the message shown next to the status arrow indicates that the case "has been successfully resolved as of today." Moreover, the user interface 500 may provide a link 540, which would allow the consumer to submit the resolved request to other credit bureaus, should the consumer choose to.

In some embodiments of FIG. 5, a second status bar 590 with additional blocks can be displayed around a particular block. In this example, the second status bar 590 may include a block 450 indicating Big Creditor's average response time and a block 460 indicating regulatory response time 460 (beyond Big Creditor's average response time). An indicator 455 may indicate where today is in view of Big Creditor's average response time 450 and the regulatory response time 460. In this example, indicator 455 shows that Big Creditor in this example has taken longer than its average response time to respond to this credit dispute resolution request but the time Big Creditor has taken is still within the regulatory required response time. In other embodiments, fewer and/or additional blocks may be included to illustrate fewer and/or additional status associated with a credit dispute resolution process.

Figure 6:
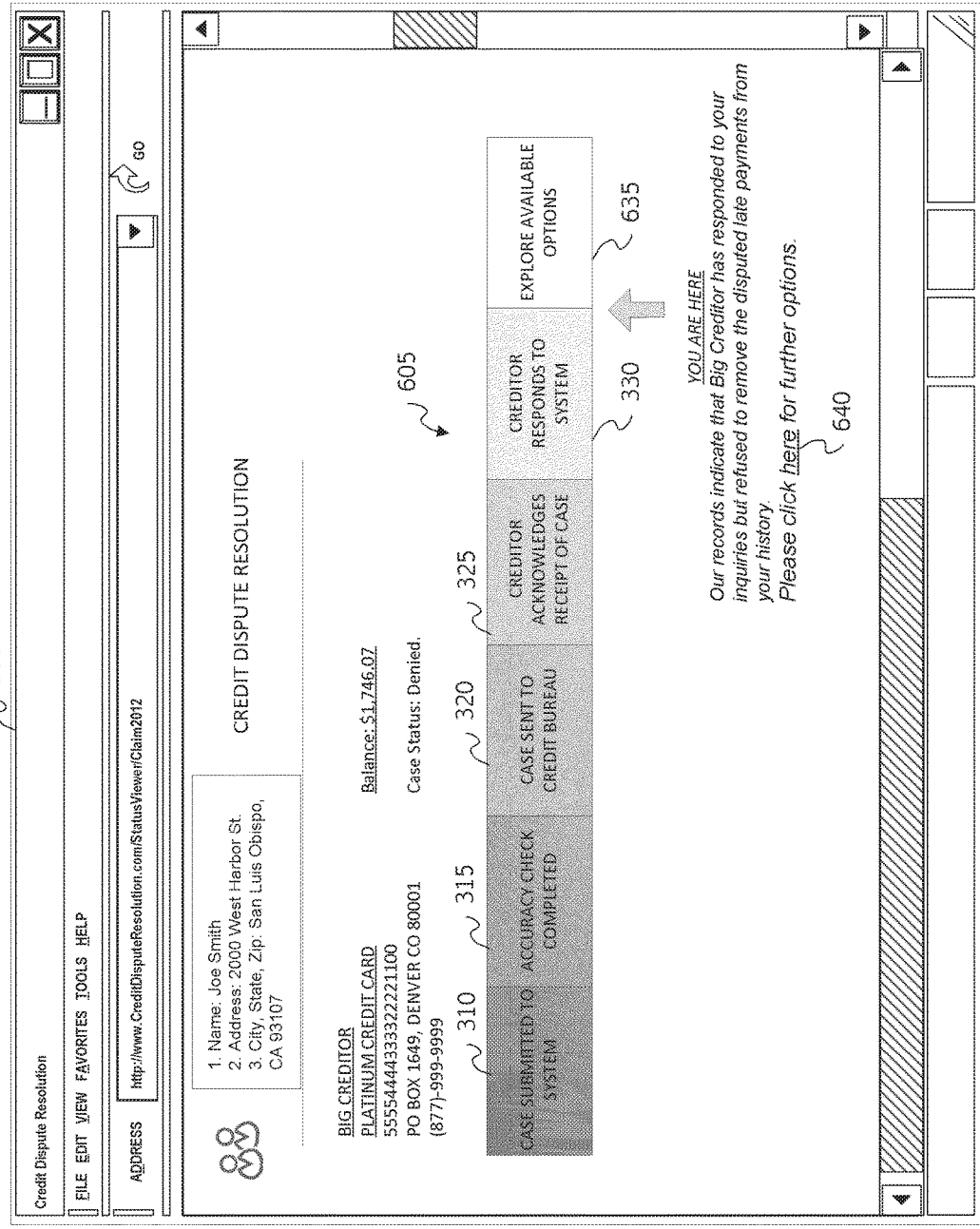
FIG. 6 is an illustrative user interface that may be generated and presented to a consumer, which includes an indication that a case has not been successfully resolved and providing options for potentially resolving the dispute.

FIG. 6 is an illustrative user interface 600 that may be generated and presented to a consumer, which includes an indication that a case has not been successfully resolved and providing options for potentially resolving the dispute.

In FIG. 6, the case status is shown as "denied." In this example, the status arrow points to the end of block 330 and the beginning of block 635 of the status bar 605, showing that Big Creditor has already responded to the system but the credit dispute resolution request was denied. In this example, the next step may be to explore available options, if any, as shown in block 635.

In this example, the message shown next to the status arrow indicates that Big Creditor has responded to the consumer's inquiries but refused to remove the disputed late payments from the consumer's credit history. Moreover, the user interface 600 may provide a link 640, which would allow the consumer to explore further options, if available.

The further options may include, for example, identifying the reason (if any) a creditor has refused to resolve the dispute, identifying any additional support documents that were not presented in order to help resolve the dispute, providing contact information of credit dispute resolution services, placing phone calls on the consumer's behalf, and so forth. The credit dispute resolution system 110 may identify possible additional support documents that were not presented by comparing the list of documents submitted by a consumer whose dispute resolution request was denied against typical documents submitted by consumers who had similar but successfully resolved requests. For example, typical documents submitted by consumers who had similar but successfully resolved requests may include proof of income, proof of employment, proof of payment, proof of other sources of income, and so forth.

In other embodiments, fewer and/or additional blocks may be included to illustrate fewer and/or additional status associated with a credit dispute resolution process.

Figure 7:
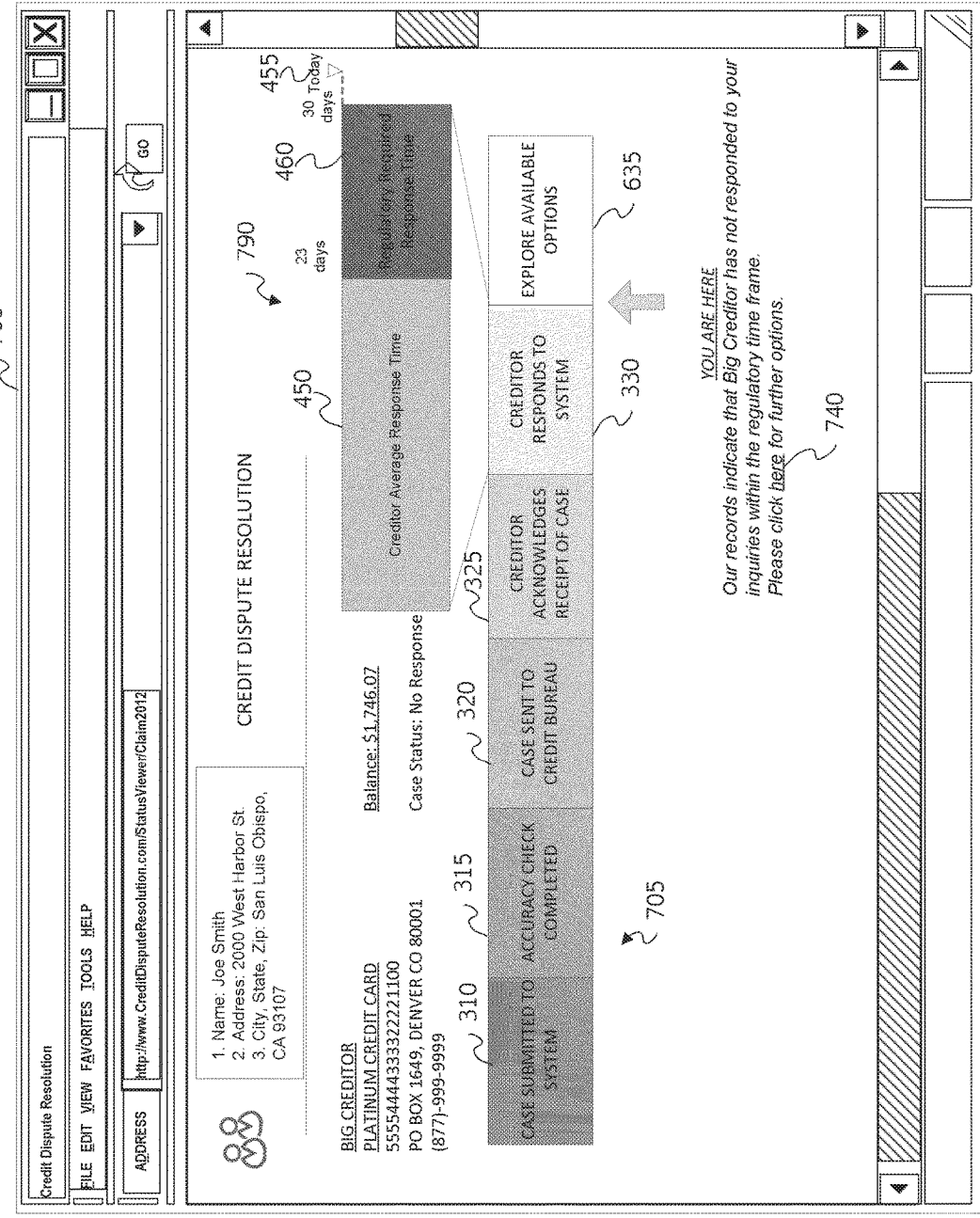
FIG. 7 is an illustrative user interface that may be generated and presented to a consumer, which includes an indication that that a creditor has not responded to the dispute within regulatory time frame and providing options for taking further actions.

FIG. 7 is an illustrative user interface 700 that may be generated and presented to a consumer, which includes an indication that a creditor has not responded to the dispute within regulatory time frame and providing options for taking further actions.

In FIG. 7, the case status is shown as "no response." In this example, the status arrow points to the end of block 330 and the beginning of block 635 of the status block 705, indicating that Big Creditor has not responded to the system within the regulatory response time. The next step may be to explore further options.

A second status bar 790 with additional blocks can be displayed around a particular block. In this example, the second status bar 790 may include a block 450 indicating Big Creditor's average response time and a block 460 indicating regulatory response time (beyond Big Creditor's average response time).

An indicator 455 may indicate where today (e.g., the day the consumer accesses the user interface 700) is in view of the creditor's average response time 450 and the regulatory response time 460. In this example, indicator 455 shows that Big Creditor has taken longer than its average response time to respond to this credit dispute resolution request. Moreover, indicator 455 also shows that Big Creditor has not responded within the regulatory required response time.

In this example, the message shown next to the status arrow indicates that Big Creditor has not responded to the consumer's inquiries within the regulatory required response time. Moreover, the user interface 700 may provide a link 740, which would allow the consumer to explore further options, if available. The options available may include, for example, documents, links, and contact information related to federal, state, and/or other regulations of consumer credit disputes, and so forth. The options may also include an automatic form letter generation tool that enables the consumer to generate a letter. The letter may include the credit dispute, the consumer's information, account information, the history of consumer's credit dispute resolution request, and/or other relevant information. In other embodiments, fewer and/or additional blocks may be included to illustrate fewer and/or additional status associated with a credit dispute resolution process.

FIG. 8 is an illustrative user interface 800 that may be generated and presented to a consumer, which allows the consumer to submit a successfully resolved dispute to other credit bureaus and/or credit dispute services.

The example user interface 800 lists two credit bureaus, 805 and 810, which represents Credit Bureau 1 and Credit Bureau 2, respectively, are presented to a consumer. By choosing the credit bureaus and/or credit dispute services, the consumer's credit dispute resolution request and/or other relevant information may be submitted to the chosen credit bureaus and/or credit dispute services. In other embodiments, fewer and/or additional credit bureaus and/or credit dispute services may be included. In one embodiment, the credit dispute resolution system automatically transmits the dispute resolution information directly to the selected credit bureaus, without further involvement from the consumer. In other embodiments, the credit dispute resolution system provides template letters and/or other documents that may be sent (by mail, fax, email, etc.) by the consumer to the other credit bureaus. Advantageously, such documents may be used to simplify the process of updating information regarding the dispute at the other credit bureaus. In other embodiments, the credit dispute resolution system interfaces directly with multiple credit bureau such that transmission of credit dispute resolution information is seamlessly provided to the multiple credit bureaus.

All of the user interfaces discussed above, such as those in FIGS. 4-8, may also be modified for display on mobile devices, such as smart phones or tablets. For example, the user interface of FIG. 4 may be parsed into multiple screens for better display on a smaller screen. However, the same and/or similar functionality that is discussed above may also be included in applications and/or websites for display on mobile devices.

Figure 9A:
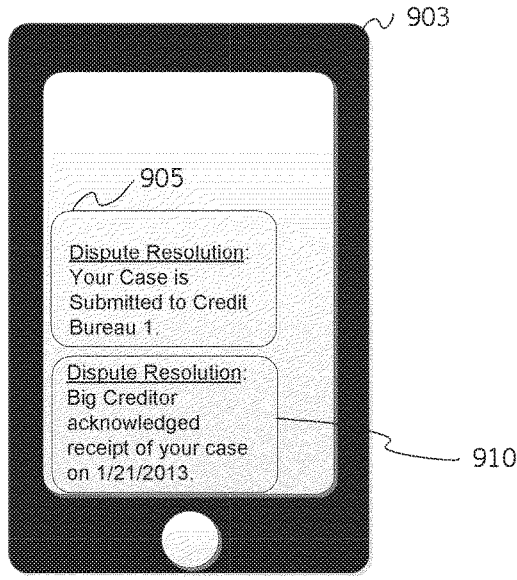
FIG. 9A-9C are illustrative user interfaces that include alerts and/or messages that may be generated and presented to a consumer.
Figure 9B:
Figure 9C:
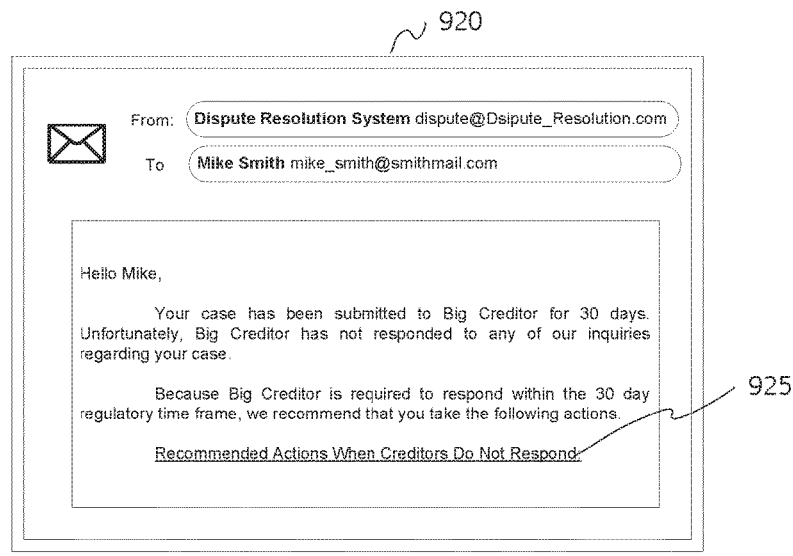

FIGS. 9A-9C include alerts and/or messages that may be generated and presented to a consumer. In FIG. 9A, a mobile user interface 903 is shown. The mobile user interface 903 in this example includes two messages/alerts. Message/alert 905 informs a consumer that the consumer's case has been submitted to Credit Bureau 1. The mobile user interface 910 informs a consumer that Big Creditor acknowledged receipt of the consumer's case on Jan. 21, 2013.

Depending on the embodiment, the user may have options to specify that alerts are sent when the consumer's dispute resolution case has moved from one of block to another (e.g.

the blocks in the status bars of FIGS. 5-8). Alternatively, the consumer may wish to receive alerts only when certain activities have occurred, such as when the dispute has been submitted to the credit Bureau and/or when the creditor has not responded to a submitted dispute within the expected timeframe and/or the regulatory time frame.

Depending on the embodiment, the consumer may set preferences for delivery of alerts any available manner, such as via text messages, email, telephone call, smart phone application, etc. In some embodiments, alerts may include links to further information regarding the consumer's dispute. For example, in embodiment of FIG. 9A the consumer may click on the dispute resolution link in either messages 905 or 910 in order to navigate to a webpage that displays the credit dispute timeline, such as is illustrated in FIGS. 4-8.

In FIG. 9B, a mobile user interface 912 is shown. The mobile user interface 915 in this example includes a message/alert 915, which shows that Big Creditor has asked for proof of a consumer's payment. The message/alert also asks the consumer to submit a copy of his or her payment on Dec. 4, 2012 to the credit dispute resolution system's website. In this embodiment, the user interface 912 may include a link that takes the consumer directly to a form that may be filled out in order to provide big creditor with the requested proof of payment. Links to other related information may also be included.

In FIG. 9C, a user interface 920 is shown. In this embodiment, the user interface 920 includes an e-mail sent from the credit dispute resolution system to a consumer. The e-mail in this example informs the consumer that his case has been submitted to Big Creditor for 30 days. However, Big Creditor has not responded. Because Big Creditor is required, in this particular example, to respond within a 30-day regulatory required time frame, the consumer is recommended to take some following actions.

In some embodiments, a link 925 may be provided to a consumer which includes information regarding recommended actions when creditors do not respond. In some cases, such information may be included in the e-mail. The recommended actions when creditors do not respond may include, for example, re-submitting the credit dispute resolution request, and/or providing statistics on how often the creditor may respond when contacted again after not responding at first, and so forth.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A computer-implemented method comprising:
by software instructions executed by one or more hardware processors:
generating a first alert including an indication of a current status of a credit dispute request and a first selectable link which indicates an address at which a user interface related to the credit dispute request may be accessed;
transmitting, over a wireless communication channel, the first alert to a computing device of a user associated with the credit dispute request, wherein the first alert is configured to activate a software application of the computing device to cause the indication of the current status to display on the computing device and to enable connection via the first selectable link over the wireless communication channel to cause the user interface including the indication of the current status to be displayed on the computing device;
receiving information associated with the credit dispute request; and
in response to determining that the information indicates a change of status of the credit dispute request:
determining an updated status of the credit dispute request that is different than the current status;
generating a second alert including an indication of the updated status and a second selectable link which indicates the address at which the user interface may be accessed; and
transmitting, over the wireless communication channel, the second alert to the computing device of the user, wherein the second alert is configured to activate the software application of the computing device to cause the indication of the updated status to display on the computing device and to enable connection via the second selectable link over the wireless communication channel to cause the user interface including the indication of the updated status to be displayed on the computing device.

2. The computer-implemented method of claim 1, wherein at least one of the indication of the current status or the indication of the updated status indicates respective actions related to the credit dispute request, wherein the actions include at least one of: credit dispute request received, credit dispute case sent to credit bureau, credit dispute case acknowledged by creditor, or creditor replies to credit dispute request.

3. The computer-implemented method of claim 1, wherein the user interface further includes at least one of:
a calculated average response time associated with a creditor associated with the credit dispute request,
a calculated probability that the creditor will respond to the credit dispute request within the calculated average response time,
a determined elapsed time period associated with the credit dispute request,
a regulatory response time period for the creditor to respond to the credit dispute request,
a visual indication of whether the determined elapsed time period is larger than the calculated average response time,
an average response time associated with the creditor for a type of dispute, or
an option to initiate automatic submission of the credit dispute request to one or more additional credit bureaus.

4. The computer-implemented method of claim 1 further comprising:
by software instructions executed by the one or more hardware processors:
determining an average response time for the creditor based on one or more actual response times for the creditor in credit dispute requests of other users.

5. The computer-implemented method of claim 1 further comprising:
by software instructions executed by the one or more hardware processors:
determining a difference between a total number of days since the credit dispute request has been submitted to the creditor and a regulatory response time requirement; and
causing the user interface to further include:
an indication of the difference; and
an indication of whether the total number of days since the credit dispute request has been submitted to the creditor has exceeded the regulatory response time requirement.

6. A credit dispute resolution computing system comprising:
a computer readable storage medium having software instructions stored thereon; and
one or more processors configured to execute the software instructions to cause the one or more processors to:
generate a first alert including an indication of a current status of a credit dispute request and a first selectable link which indicates an address at which a user interface related to the credit dispute request may be accessed;
transmit, over a wireless communication channel, the first alert to a computing device of a user associated with the credit dispute request, wherein the first alert is configured to activate a software application of the computing device to cause the indication of the current status to display on the computing device and to enable connection via the first selectable link over the wireless communication channel to cause the user interface including the indication of the current status to be displayed on the computing device;
receive information associated with the credit dispute request; and
in response to determining that the information indicates a change of status of the credit dispute request:
determine an updated status of the credit dispute request that is different than the current status;
generate a second alert including an indication of the updated status and a second selectable link which indicates the address at which the user interface may be accessed; and
transmit, over the wireless communication channel, the second alert to the computing device of the user, wherein the second alert is configured to activate the software application of the computing device to cause the indication of the updated status to display on the computing device and to enable connection via the second selectable link over the wireless communication channel to cause the user interface including the indication of the updated status to be displayed on the computing device.

7. The credit dispute resolution computing system of claim 6, wherein at least one of the indication of the current status or the indication of the updated status indicates respective actions related to the credit dispute request, wherein the actions include at least one of: credit dispute request received, credit dispute case sent to credit bureau, credit dispute case acknowledged by creditor, or creditor replies to credit dispute request.

8. The credit dispute resolution computing system of claim 6, wherein the user interface further includes at least one of:
a calculated average response time associated with a creditor associated with the credit dispute request,
a calculated probability that the creditor will respond to the credit dispute request within the calculated average response time,
a determined elapsed time period associated with the credit dispute request,
a regulatory response time period for the creditor to respond to the credit dispute request,
a visual indication of whether the determined elapsed time period is larger than the calculated average response time,
an average response time associated with the creditor for a type of dispute, or
an option to initiate automatic submission of the credit dispute request to one or more additional credit bureaus.

9. The credit dispute resolution computing system of claim 6, wherein the one or more processors are configured to execute the software instructions to cause the one or more processors to further:
determine an average response time for the creditor based on one or more actual response times for the creditor in credit dispute requests of other users.

10. The credit dispute resolution computing system of claim 6, wherein the one or more processors are configured to execute the software instructions to cause the one or more processors to further:

determine a difference between a total number of days since the credit dispute request has been submitted to the creditor and a regulatory response time requirement; and cause the user interface to further include:
an indication of the difference; and
an indication of whether the total number of days since the credit dispute request has been submitted to the creditor has exceeded the regulatory response time requirement.

11. A non-transitory computer readable storage medium having software instructions stored thereon, the software instructions executable by one or more processors to cause the one or more processors to:

generate a first alert including an indication of a current status of a credit dispute request and a first selectable link which indicates an address at which a user interface related to the credit dispute request may be accessed;

transmit, over a wireless communication channel, the first alert to a computing device of a user associated with the credit dispute request, wherein the first alert is configured to activate a software application of the computing device to cause the indication of the current status to display on the computing device and to enable connection via the first selectable link over the wireless communication channel to cause the user interface including the indication of the current status to be displayed on the computing device;

receive information associated with the credit dispute request; and in response to determining that the information indicates a change of status of the credit dispute request:
determine an updated status of the credit dispute request that is different than the current status;

generate a second alert including an indication of the updated status and a second selectable link which indicates the address at which the user interface may be accessed; and transmit, over the wireless communication channel, the second alert to the computing device of the user, wherein the second alert is configured to activate the software application of the computing device to cause the indication of the updated status to display on the computing device and to enable connection via the second selectable link over the wireless communication channel to cause the user interface including the indication of the updated status to be displayed on the computing device.

12. The non-transitory computer readable storage medium of claim 11, wherein at least one of the indication of the current status or the indication of the updated status indicates respective actions related to the credit dispute request, wherein the actions include at least one of: credit dispute request received, credit dispute case sent to credit bureau, credit dispute case acknowledged by creditor, or creditor replies to credit dispute request.

13. The non-transitory computer readable storage medium of claim 11, wherein the user interface further includes at least one of:
a calculated average response time associated with a creditor associated with the credit dispute request,
a calculated probability that the creditor will respond to the credit dispute request within the calculated average response time,
a determined elapsed time period associated with the credit dispute request,
a regulatory response time period for the creditor to respond to the credit dispute request,
a visual indication of whether the determined elapsed time period is larger than the calculated average response time,
an average response time associated with the creditor for a type of dispute, or
an option to initiate automatic submission of the credit dispute request to one or more additional credit bureaus.

14. The non-transitory computer readable storage medium of claim 11, wherein the software instructions are executable by one or more processors to further cause the one or more processors to:
determine an average response time for the creditor based on one or more actual response times for the creditor in credit dispute requests of other users.

15. The non-transitory computer readable storage medium of claim 11, wherein the software instructions are executable by one or more processors to further cause the one or more processors to:
determine a difference between a total number of days since the credit dispute request has been submitted to the creditor and a regulatory response time requirement; and
cause the user interface to further include:
an indication of the difference; and
an indication of whether the total number of days since the credit dispute request has been submitted to the creditor has exceeded the regulatory response time requirement.

\* \* \* \* \*